(12) United States Patent
Hausladen et al.

(10) Patent No.: US 6,486,783 B1
(45) Date of Patent: Nov. 26, 2002

(54) RFID COMPOSITE FOR MOUNTING ON OR ADJACENT METAL OBJECTS

(75) Inventors: Michael C. Hausladen, Amherst, NY (US); Thomas P. Nash, Getzville, NY (US); Nancy Mitchell, Brand Island, NY (US); Joseph T. Duffy, Kenmore, NY (US)

(73) Assignee: Moore North America, Inc., Grand Island, NY (US)

( * ) Notice: Subject to any disclaimer, the term of this patent is extended or adjusted under 35 U.S.C. 154(b) by 32 days.

(21) Appl. No.: 09/665,311

(22) Filed: Sep. 19, 2000

(51) Int. Cl.[7] .............................................. G08B 13/14
(52) U.S. Cl. ................. 340/572.8; 340/572.1; 235/487
(58) Field of Search .......................... 340/572.1, 571, 340/572.8, 572.2, 572.3, 572.4, 572.5, 572.6, 572.7, 572.9; 235/487, 488; 343/878

(56) References Cited

U.S. PATENT DOCUMENTS

| | | | |
|---|---|---|---|
| 4,061,579 A | * 12/1977 | Sawko | 252/8.1 |
| 4,390,576 A | * 6/1983 | Hutter | 428/40 |
| 5,202,688 A | 4/1993 | Hubbard et al. | |
| 5,206,626 A | 4/1993 | Minasy et al. | |
| 5,448,110 A | 9/1995 | Tuttle et al. | |
| 5,497,140 A | 3/1996 | Tuttle | |
| 5,499,015 A | * 3/1996 | Winkler | 340/551 |
| 5,691,667 A | 11/1997 | Pickering et al. | |
| 6,245,434 B1 | * 6/2001 | Shinozaki | 428/472 |
| 6,262,692 B1 | * 7/2001 | Babb | 343/893 |
| 6,294,998 B1 | * 9/2001 | Adams | 340/572.8 |

FOREIGN PATENT DOCUMENTS

| | | |
|---|---|---|
| AU | 199948796 | 3/2000 |
| EP | 0 730 254 | 9/1996 |
| EP | 0 955 616 | 11/1999 |
| EP | 0 989 513 | 3/2000 |

* cited by examiner

Primary Examiner—Anh La
(74) Attorney, Agent, or Firm—Nixon & Vanderhye P.C.

(57) ABSTRACT

A composite containing an RFID can be mounted on, in, or adjacent a metal object without de-tuning of the antenna of the RFID. The composite includes a first RFID or a EAS device-containing layer, and a foamable material layer held in proximity with the first layer. The foamable material layer expands in size and reduces in density when subjected to external stimuli, such as heat or microwaves. The foamable layer may comprise an intumescent material, and may have RF radiation-absorbing material filler. Pressure sensitive adhesive, when the composite is in a label form, may be used to mount the composite on or adjacent a metal object after printing of the printable surface of the composite, and the foamable material layer is subjected to the external stimuli after printing and either before or after mounting on or adjacent the metal object.

20 Claims, 2 Drawing Sheets

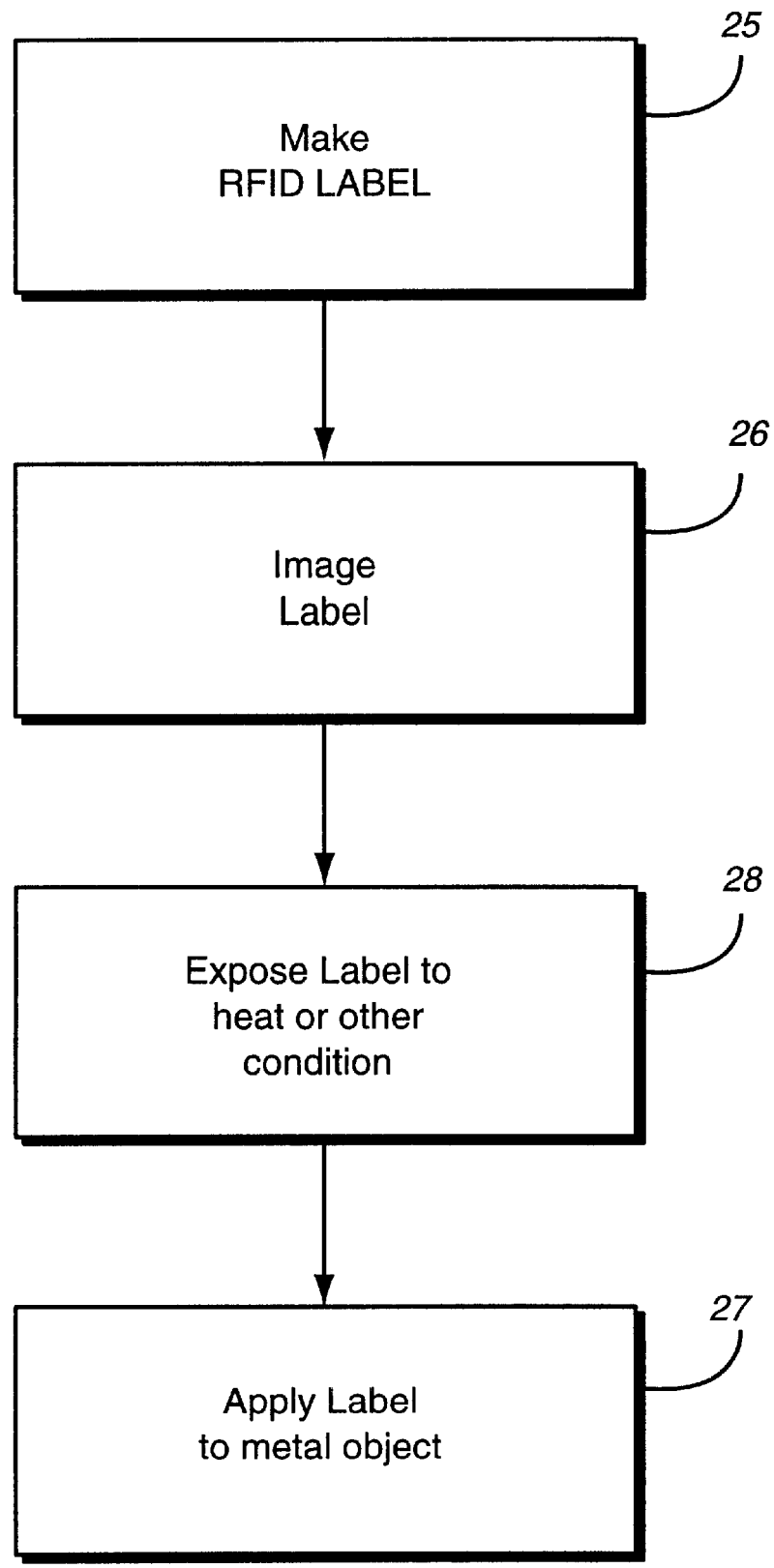

RFID COMPOSITE FOR MOUNTING ON OR ADJACENT METAL OBJECTS

BACKGROUND AND SUMMARY OF THE INVENTION

The use radio frequency devices, known as RFIDs has been increasingly widespread since such devices, or their equivalents (such as EAS devices) provide numerous practical advantages in a number of environments. As a result RFID devices have been incorporated in a wide variety of products, including labels and tags, such as shown in co-pending application Ser. Nos. 09/499,347 filed Feb. 8, 2000 and 09/393,291 filed Sep. 10, 1999 and U.S. Pat. Nos. 5,206,626, 5,497,140, and 5,448,110 (the disclosures of which are hereby incorporated by reference herein). However there is one environment in which it is difficult to use conventional RFID-containing devices, and that in association with metal objects. For example if no special precautions are taken and an RFID-containing label or tag is affixed to a metal object, the metal is likely to de-tune the RFID antenna. This typically is mitigated by the use of significant amounts of RF absorbing materials, or by spacing the antenna off of the metal. However if layers thick enough to properly space the RFID antenna off of the metal to which the label is affixed are utilized, then the labels are large and bulky. This reduces the efficiency of distribution and also makes printing on the device impractical using conventional printers used for printing documents.

According to the present invention a label, tag, or other composite device, is provided which overcomes the drawbacks discussed above. According to the present invention it is possible to provide a composite, such as a label or tag, that may be affixed to a metal object while substantially avoiding antenna de-tuning, but yet is not bulky or hard to handle, and can be readily imaged, including using conventional printers for imaging documents. This advantageous result is obtained according to the present invention by providing a foamable material layer of the composite (e.g. label or tag) that expands in size and reduces in density when subjected to a foaming-initiating activation. For example the foamable material layer may comprise an intumescent material, so that when heated it will decompose and/or form a gas and/or go through a phase change. Therefore after printing the layer may be subjected to heat, microwaves, or other foaming-initiating activity and then applied to a metal object, or it may be heated or otherwise activated when it is applied (such as by a self-contained pressure sensitive adhesive when in label form) to the metal object.

According to one aspect of the present invention there is provided a composite comprising: A first RFID or EAS device-containing layer. And, a foamable material layer held in proximity with the first layer, the foamable material layer expanding in size and reducing in density when subjected to foaming-initiating activation.

The foamable material layer may include an intumescent material, such as an azide compound which decomposes on heating, and/or a compound which will form a gas on heating, and/or conventional compounds that will phase change upon heating. Microwaves may also activate the foamable material, and other types of materials that foam in response to a condition may be utilized besides microwave-activated or intumescent materials.

The foamable material layer may also include RF radiation-absorbing materials, typically as fillers. A wide variety of such materials are commercially available including those shown in U.S. Pat. Nos. 5,202,688 and 5,691,667.

The composite may comprise a wide variety of other layers. For example there may be adhesive layers which operatively connect various other layers to each other. For example there may be a layer of adhesive operatively connecting the first and foamable material layers, either directly engaging both of those layers, or engaging one of the layers and an intermediate layer, or two intermediate layers. The composite also preferably comprises a printable surface layer, such as paper, on the opposite side of the first layer from the foamable material layer, and an adhesive, such as a pressure sensitive adhesive, of conventional construction, can connect the RFID device to the paper layer either directly, or through one or more intermediate layers. Also the device, especially with a printable surface layer, may be in label configuration and comprise a pressure sensitive adhesive layer operatively connected to the foamable material layer on the opposite side thereof from the first layer, either directly connected to the foamable material layer or to one or more intermediate layers. The label may be linerless, or may comprise a conventional liner of silicone coated paper or like material.

Typically indicia is imaged on the printable surface layer, and only after that imaging (e.g. in a conventional printer) is the composite subjected to the foaming-initiating activity. The pressure sensitive adhesive may adhere the composite to or adjacent a metal object, but because of the foamed layer (or multiple layers) and perhaps radiation absorbing material, especially as filler in the foamed layer, the RFID antenna will not de-tune during the operative life of the RFID.

According to another aspect of the present invention there is provided a method of utilizing an RFID, comprising: (a) Making a composite material having an RFID and at least one foamable material layer activatable by external stimuli. (b) Placing the composite in operative association with a metal object. And, (c) applying external stimuli to effect foaming of the foamable material to space the RFID from the metal object.

In the method (a) may be practiced so that the composite has a printable layer; and the method then further comprises (d) imaging the printable layer (e.g. using a conventional document printer) prior to (c). In the method (c) may be practiced before or after (b). In one embodiment the foamable material is an intumescent material, and (c) is practiced by applying heat, such as by using a hair dryer, soldering gun (that does not actually touch the composite), or a wide variety of other conventional devices. Also (a) may be further practiced by adding RF radiation-absorbing material to the foamable material as filler.

It is the primary object of the present invention to provide an easy to use, and adaptable, RFID containing composite (such as a label or tag) in association with a metal object without antenna de-tuning during the useful life of the RFID. This and other objects of the invention will become clear from an inspection of the detailed description of the invention and from the appended claims.

BRIEF DESCRIPTION OF THE DRAWINGS

FIG. 4 is a box diagram showing an exemplary method according to the present invention.

DETAILED DESCRIPTION OF THE DRAWINGS

Figure 1:
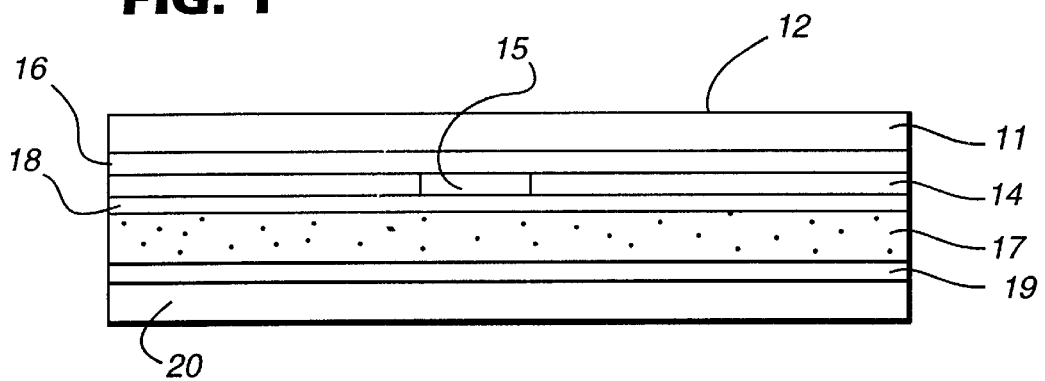
FIG. 1 is a side schematic view, with the size of the layers and the proportions exaggerated for clarity of illustration, of one form of an exemplary composite according to the invention.

FIG. 1 schematically illustrates a composite 10 according to the invention. While certain layers are illustrated in FIG. 1, that is for illustrative purposes only, and fewer or more layers may be provided including multiple foamable layers, as will be hereinafter described.

Figure 3:
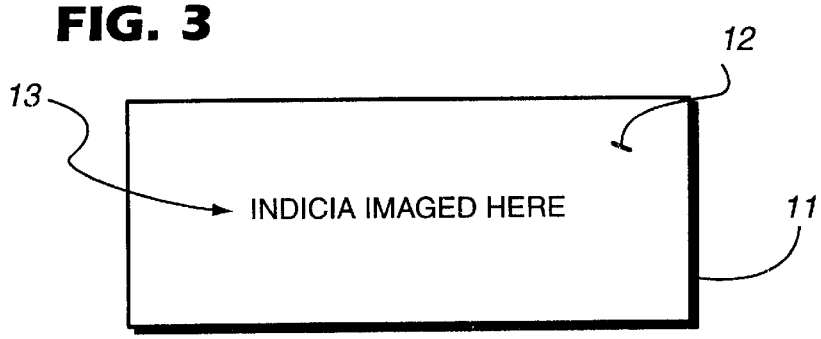
FIG. 3 is a top plan view of the composite of FIG. 1.

For the particular embodiment illustrated in FIG. 1, starting from the top, there is a layer 11 having a printable surface 12, such as a paper layer of conventional construction as used in labels. The printable surface 12 may have indicia imaged thereon, as illustrated schematically at 13 in FIG. 3, such as by using a conventional document printer.

Figure 2:
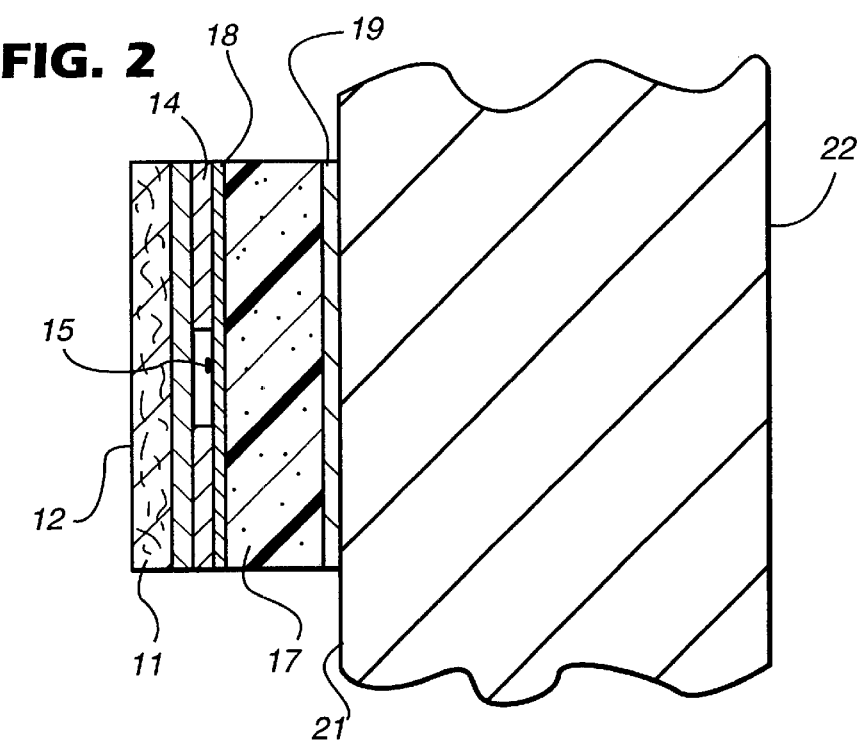
FIG. 2 is a side schematic cross-sectional view of the composite of FIG. 1 with the liner removed and adhered to a metal object, and with the foamable layer foamed.

The composite 10 also comprises an RFID (or EAS device)—containing layer shown schematically at 14 in FIGS. 1 and 2, a portion of the RFID device shown schematically at 15. The layer 14 may comprise any conventional RFID layer, such as shown in the co-pending applications mentioned above, or in the patents mentioned above. The layers 11, 14 are operatively connected to each other, e.g. by a layer 16 of pressure sensitive adhesive (or under some circumstances other types of adhesive) directly adhered to both of the layers 11, 14, or adhered to one or both of them through one or more intermediate layers.

The composite 10 also comprises a foamable material layer 17. The layer 17 includes at least one material that is capable of foaming when exposed to external stimuli, such as a thermoplastic or thermosetting or a hybrid material intermixed with a foam forming agent that will form gas when activated. For example the foamable material of the layer 17 may comprise an intumescent material, such as an azide, or any other types of a wide variety of materials may be used for this purpose, such as compounds which will decompose on heating or exposure to other external stimuli, and/or which will form a gas, and/or which will undergo a phase change.

The foamable material layer 17 may also include other materials, e.g. as fillers, such as RF radiation-absorbing material, of a wide variety of conventional types, such as shown in U.S. Pat. Nos. 5,202,688 and 5,691,667. Other materials may also be present depending upon the particular foamable material or particular radiation-absorbing filler, or the like.

The foamable layer 17 may be operatively connected to the layer 14 by any conventional means, such as the adhesive (e.g. pressure sensitive adhesive) layer 18 directly engaging both of the layers 14, 17, or directly engaging one and engaging an intermediate layer with the other, or engaging two or more intermediate layers.

When the composite 10 comprises a label, it also includes a layer 19 of pressure sensitive adhesive. The layer 19 may be directly adhered to the layer 17, or adhered thereto through an intermediary, or otherwise operatively connected to the layer 17. Where a linerless label is provided as the composite 10 then no liner of conventional construction is necessary, and there is a silicone or like coating on the surface 12. However in the embodiment illustrated in FIG. 1 there is a conventional release liner 20, such as conventional silicone-coated paper.

FIG. 2 shows the composite 10 of FIG. 1 with the liner 20 removed from the adhesive layer 19, and with the layer 17 subjected to heat or other foaming-initiating stimuli. The adhesive 19 is adhered to the surface 21 of, or adjacent, a metal object 22, such as a pole, plate, housing, or the like. Because of the foaming action of the layer 17, RFID 14 is much more widely spaced from the metal object 22 than before the foaming (see FIG. 1). If RF radiation-absorbing material is provided as filler in the foamed layer 17, then the RFID 15 is even less likely to be de-tuned by the metal 22 during its operable life.

FIG. 4 schematically illustrates an exemplary method according to the present invention. An RFID label or other composite, like the composite 10, is made using conventional techniques, as illustrated by box 25. Then the composite 10 is imaged, e.g. using a conventional document printer because the composite 10 is relatively thin, as illustrated at 26, with the indicia 13 (see FIG. 3) being printed on the printable surface 12 of the composite 10. The composite 10 is applied to the metal object 22, as indicated schematically at 27 in FIG. 4, and such as illustrated in FIG. 2, and the procedure 27 may be practiced either before or after the composite 10 is exposed to heat (see box 28 in FIG. 4) or other foaming-initiating stimuli.

It will thus be seen that according to the present invention a very effective and versatile composite, and method of utilization thereof, are provided which allow utilization of the composite directly on, in, or adjacent metal objects. While the invention has been herein shown and described in what is presently conceived to be the most practical and preferred embodiment thereof it will be apparent to those of ordinary skill in the art that many modifications may be made thereof within the scope of the invention, which scope is to be accorded the broadest interpretation of the appended claims so as to encompass all equivalent structures and methods.

What is claimed is:

1. A composite comprising:
   a first layer containing an RFID or EAS device; and
   a foamable material layer held in proximity with said first layer, said foamable material layer expanding in size and reducing in density when subjected to foaming-initiating activation,
   wherein the composite is configured to expand in width when said foamable material is subjected to foaming-initiating activation.

2. A composite as recited in claim 1 wherein said foamable material layer includes an intumescent material.

3. A composite as recited in claim 1 wherein said foamable material layer includes RF radiation-absorbing material filler.

4. A composite as recited in claim 1 further comprising a layer of adhesive operatively connecting said first and foamable material layers.

5. A composite as recited in claim 1 further comprising a printable surface layer on the opposite side of said first layer from said foamable material layer.

6. A composite as recited in claim 5 further comprising a pressure sensitive adhesive layer operatively connected to said foamable material layer on the opposite side thereof from said first layer.

7. A composite as recited in claim 6 wherein said pressure sensitive adhesive layer is affixed to a metal object.

8. A composite as recited in claim 6 wherein said pressure sensitive adhesive layer is covered by a release liner.

9. A composite as recited in claim 5 further comprising indicia imaged on said printable surface layer.

10. A composite as recited in claim 7 wherein said foamable material layer has foamed.

11. A composite as recited in claim 10 further comprising RF radiation-absorbing material in said foamed layer.

12. A method of utilizing an RFID, comprising:
(a) making a composite material having an RFID and at least one foamable material layer activatable by external stimuli;
(b) placing the composite in operative association with a metal object; and
(c) applying external stimuli to effect foaming of the foamable material to space the RFID from the metal object.

13. A method as recited in claim 12 wherein step (a) is practiced so that the composite has a printable layer; and further comprising (d) imaging the printable layer prior to step (c).

14. A method as recited in claim 12 wherein step (c) is practiced after step (b).

15. A method as recited in claim 13 wherein step (c) is practiced after step (b).

16. A method as recited in claim 12 wherein the foamable material is an intumescent material, and wherein step (c) is practiced by applying heat.

17. A method as recited in claim 12 wherein step (a) is further practiced by adding RF radiation absorbing material to the foamable material as filler.

18. A method as recited in claim 13 wherein step (a) is further practiced by adding RF radiation absorbing material to the foamable material as filler.

19. A method as recited in claim 15 wherein the foamable material is an intumescent material, and wherein step (c) is practiced by applying heat.

20. A method as recited in claim 16 wherein step (a) is further practiced by adding RF radiation absorbing material to the foamable material as filler.

* * * * *